United States Patent [19]

Parks et al.

[11] 4,067,466

[45] Jan. 10, 1978

[54] REFUSE EJECTION DOOR

[76] Inventors: Melvin Ray Parks, P.O. Box 1037, Boise, Idaho 83701; Melvin Hal Parks, 1079 S. 160 East, Orem, Utah 84057

[21] Appl. No.: 781,155

[22] Filed: Mar. 25, 1977

[51] Int. Cl.$^2$ .......... B60P 1/26; B65F 3/00

[52] U.S. Cl. .......... 214/82; 222/561; 296/50; 296/51

[58] Field of Search .......... 214/82, 83.18; 296/50, 296/51, 56; 222/559, 561

[56] References Cited

U.S. PATENT DOCUMENTS 3,966,096 6/1976 Worthington .......... 222/559 X

*Primary Examiner*—Robert G. Sheridan

*Attorney, Agent, or Firm*—Criddle, Thorpe & Western

[57] ABSTRACT

In a refuse compaction/ejection system, an improved ejection door having a lower hinged member which reduces the degree of door extension required to obtain an effective open discharge path and a catch-lock means for guiding and retaining the hinged member into closed configuration when the door is in the unextended position. The lower door member is hinged to an upper member which travels a fixed upward path during ejection operations. As the hinged member is carried upward by the upper member, the lower lip of the lower member is withdrawn from the catch-lock means, permitting rotation in an axial rearward direction about the hinge due to the force of discharging refuse. With the refuse ejected, the hinged member returns to its nonrotated natural position, causing the lip of the lower hinged member to catch in rearwardly extending catch-lock means upon the retraction cycle.

10 Claims, 2 Drawing Figures

REFUSE EJECTION DOOR

BACKGROUND OF THE INVENTION

1. Field of Invention

This invention relates to material compaction and ejection systems, more particularly, to the ejection door for such systems.

2. Prior Art

With increased demands in the refuse collection industry for trucks having greater mobility and versatility to handle the difficult collection routes having limited access, numerous small compaction units have been developed. Customarily, refuse is collected in the smaller truck at limited access points, compacted, and eventually delivered to a parent truck, where the refuse transfer is accomplished by ejection from the smaller compaction unit.

The door through which the ejected refuse passes (herein referred to as the ejection door) remains closed during the refuse collection/compaction operations and functions as a containing wall for the compacted refuse. This door must, therefore, be capable of withstanding the compaction pressures transferred through the refuse from the compaction blades within the overall system.

In addition to being able to retain the collected refuse and withstand the compaction forces, the ejection door is normally opened in coordinated manner with the operation of the ejection blade within the compaction unit.

Current compaction/ejection systems include both manual and automated ejection door assemblies. A typical manual assembly would simply comprise a latch means which can be released by the operator to allow the ejection door to open for discharge. More common, however, are the automated ejection doors which are hydraulically operated to provide a clear discharge path upon actuation of the discharge blade.

Such automated doors are of single body construction in various geometrical configurations. The nature of geometric design will vary with the type of lift mechanism utilized. For example, a vertical lift door will need to be of such construction so that the hydraulic lifters will not be required to compact refuse caught between the lifting door and the top cover of the compaction unit. It should be noted that a considerable force is being exerted on the door by the compacted refuse, providing a resistance to movement in the vertical direction.

If the vertical ejection door were curved away from the truck body the compacted refuse contained in the curved volume of the door would tend to move with the vertically rising door, developing resistance forces against the nonrising refuse. This results in increased energy and time losses. Therefore, conventional vertical lift doors are flat to minimize this type of resistance during ejection procedures.

To obtain the maximum storage area for refuse, some compaction units use a rearwardly curved ejection door providing additional compaction space beyond the rear portion of the truck bed. To avoid the vertical lift problems previously indicated, a typical ejection door for this configuration would involve hydraulic lifting means which operate to extend the ejection door rearward and upward, thereby avoiding resistive forces which might be exerted by the refuse contained within the curved portion of the door during vertical extension.

Both the straight and curved geometric configurations of the single body ejection door require a substantial full extension of the door body to obtain the full discharge path. This not only requires additional overhead or rearward space at the discharge location, but also requires additional operator time to fully extend the hydraulic cylinders.

OBJECTS AND SUMMARY OF THE INVENTION

It is therefore an object of the present invention to provide an improved ejection door system which minimizes the extent of door movement required to obtain a full discharge path.

It is a further object of this invention to provide a vertical-lift ejection door having a rearwardly extending storage capacity to improve storage efficiency in vertical lift systems.

It is an additional object of this invention to provide a locking means which automatically cooperates with the vertical-lift mechanism and ejection door to lock the ejection door in closed configuration with the compaction body automatically upon retraction of the extended door.

The present invention provides the benefits of the curved type ejection doors having increased storage capacity, with the decreased spatial requirements of the vertical lift systems. In addition, the extent of the displacement path for the ejection door is greatly reduced. Both of these aspects are accomplished by means of a two member ejection door, the upper member being substantially fixed in orientation with respect to the compaction body. An hydraulic system operates to extend and retract this portion of the ejection door along its fixed path, to the extent required to obtain the appropriate discharge path for the compacted refuse.

The lower portion of the ejection door comprises a lower member attached by means of a hinge to the upper portion of the ejection door, such that the lower member rotates about the hinged contact. As the ejection door is raised the lower hinged member is released from a catch-lock system which retains the hinged member in closed configuration with the compaction compartment when the ejection door is in the nonextended position.

Extension of the hydraulic means to raise the ejection door releases the hinged member from the locking system, permitting free movement of this member in a rearward direction to provide an open discharge path without full extension of the ejection door. Upon full discharge of the refuse, the lower member returns to its nonrotated position and retraction of the door positions the lower member in the locked configuration.

DETAILED DESCRIPTION OF THE INVENTION

Figure 1:
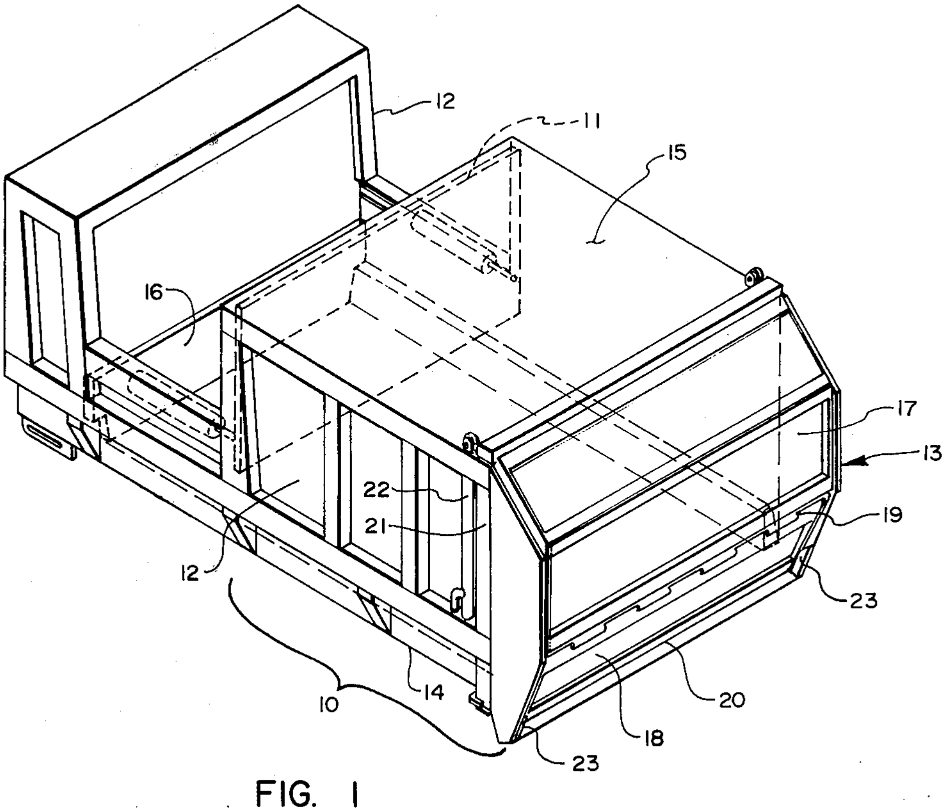
FIG. 1 is a view of a storage compartment and rearward ejection door in closed position.

Referring to FIG. 1, the improved rearward ejection door disclosed herein is represented in the closed configuration. The ejection door comprises an upper member 17 and a lower member 18 which in combination operate to contain the refuse within the compaction unit during nonejection operations.

Figure 2:
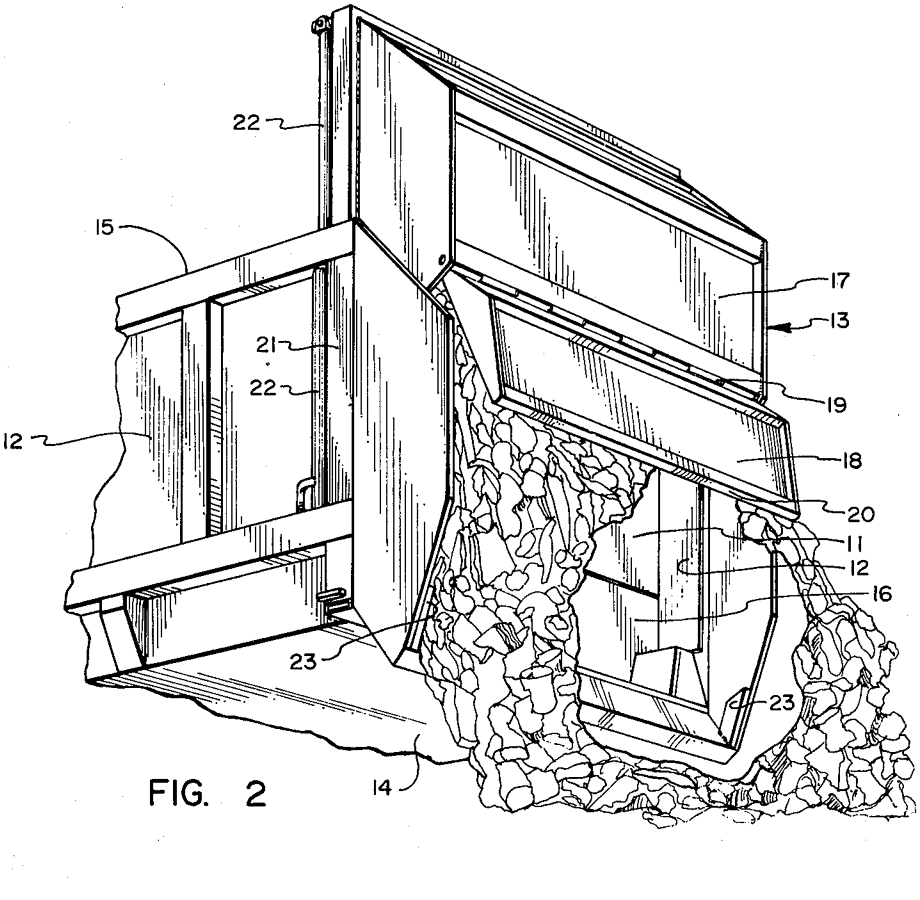
FIG. 2 is a view of the ejection door in open position.

A preferred embodiment of the present invention is illustrated in FIGS. 1 and 2. In the material compaction and ejection system shown, the storage compartment 10 is defined by side walls 12, supporting base 14, top cover means 15, ejection blade 11, compaction blade 16 and ejection door 13. The compaction blade 16 is shown in its fully retracted position, where it remains until extended to transfer refuse to the storage compartment 10 from the receiving area defined by the space below and between the open side sections of the side walls 12. When the storage compartment 10 is filled with refuse this smaller compaction unit will rendezvous with a parent truck to discharge its contents by ejecting the material out the rear, ejection door 13.

The ejection door is comprised of two members, an upper section 17 and a lower section 18. During the ejection procedures, the upper section travels a substantially fixed path with respect to the storage compartment. In the disclosed embodiment, this path is controlled by a slotted guide means 21 located adjacent to the hydraulic lifting means 22. The lower section 18 of the ejection door 13 is hinged to the upper member 17 along the lower horizontal base line 19 of the upper section.

When the ejection door is in the nonextended position (FIG. 1) the lower section 18 is retained in closed combination with the storage compartment 10 by means of a pair of latch plates 23. In this closed configuration the ejection door is fully capable of withstanding the compaction pressures and retaining the refuse within the storage compartment.

When the storage compartment is filled, its contents may be evacuated by extending the ejection door 13 as shown in FIG. 2. It should be noted that the ejection door need not be fully extended because the hinged member permits discharge of the refuse without the door being raised above the upper level of contained refuse. Additionally, the lower hinged section 18 permits the use of an extended storage volume in the ejection door, since there will be little upward force applied from the lower hinged member once its lip 20 is extended beyond the latch plates 23.

A discussion of the sequential steps involved in the ejection of refuse by the present system will be useful in identifying the inventive concept. After the filled compaction and ejection system is appropriately situated adjacent to the receiving area for the refuse to be discharged, the operator actuates the hydraulic cylinders 22 commencing extension of the ejection door. It is noteworthy that no rearward movement occurs which might cause injury to the operator or other persons located behind the ejection door. This configuration also permits close proximate location of the ejection door area to the receiving area, in view of the absence of any substantial rearward movement of the ejection door 13.

As the ejection door begins its vertical movement the lower lip 20 of the hinged section 18 advances above the locking means 23 which retained the hinged section in closed configuration. Upon clearance of this locking means, the hinged section is free to rotate rearward in an axial direction about hinge 19. As the ejection door continues along its vertical path the contained refuse is forced rearward by the coordinated movement of the discharge blade 11 and compaction blade 16, as more particularly shown in FIG. 2. The force exerted by the discharging refuse causes the lower hinged section to rotate rearward providing a full discharge path without the need for full extension of the ejection door.

After the contents of the compaction compartment have been evacuated, the lower hinged section naturally gravitates to a more vertical orientation, in proximate location to the storage compartment. The hydraulic lifting means 22 are retracted, returning the ejection door 13 along its fixed path 21 toward the nonextended position. The lock means 23 operate to guide the lower hinge member 18 by contacting its lower lip 20 and directing its movement to a closed and locked configuration as shown in FIG. 1.

Numerous locking means are available to implement this concept. In the figures, the locking means is shown as a latch plate firmly affixed to a nonmovable portion of the compaction compartment. When the hinged section 18 is oriented in combination with the ejection door 13 such that its natural, unobstructed position is somewhat adjacent to the desired closed position, the latch plate operates as a simple, automatic locking means. This configuration is particularly well adapted for use with systems utilizing a height adjusting system to coordinate the level of discharge with the height of the receiving receptacle (i.e., a parent truck). In such a case, the slanted elevation of the ejection door results in gravitational forces on the lower hinged section which cause its return to close contact with guide means 21.

This automatic locking feature eliminates the need for the operator to take additional steps to secure the ejection door in the desired closed configuration. The further combination of this locking feature with the hinged member configuration provides the combined benefits of the conventional vertical lift ejection door with the conventional curved, rearwardly extended ejection door.

Once the ejection cycle is completed, with the ejection door in locked configuration and the ejection and compaction blades appropriately retracted, the compaction and ejection system is prepared to resume refuse collection operations. Such operations will normally involve its attachment to a mobilizing means such as a truck or flat bed; however, its envisioned uses also include its location adjacent to or as part of a structure for stationary storage purposes.

We claim:

1. In a material compaction and ejection system having a storage compartment substantially defined by a forward, extendable discharge blade in nonextended position, two stationary side walls, a rearward ejection door, a supporting floor and top cover means, said storage compartment having means for receiving and compacting said material therein, an improved rearward ejection door system comprising:

a. an upwardly extendable ejection door having an upper member fixed in an approximate vertical orientation with respect to said storage compartment when extended and a lower member connected to said upper member by a hinge means at a horizontal line across the width of said upper member and operable when unimpeded to rotate in a rearward direction about said hinge means in response to an applied force;

b. guide means operable to maintain said upper member of the ejection door in a substantially fixed path of movement relative to said storage compartment during upward extension and retraction of said door, said guide means permitting free rearward movement of said lower member about said hinge axis when said lower section is otherwise unimpeded by a locking means;

c. means for extending and retracting said door along said fixed path of movement during refuse ejection operations; and d. locking means operable to retain said lower hinged member in closed configuration with respect to said compartment when said ejection door is in the nonextended position.

2. A material compaction and ejection system as defined in claim 1, wherein said locking means comprises a latch means immovably affixed with respect to said storage compartment such that said latch operates to catch a distal edge or lip of said lower member and retain said member in closed configuration with respect to said compartment while said ejection door is in the nonextended position.

3. A material compaction and ejection system as defined in claim 2, wherein said latch means comprises a rearwardly slanting latch plate located in the vicinity of the junction of the rearward, distal inner face of said side wall and said supporting floor and being operable to catch and guide said distal edge into closed configuration with respect to said compartment.

4. A material compaction and ejection system as defined in claim 1, wherein said ejection door contains a volume of space operable as a storage space when said ejection door is in the nonextended position.

5. A material compaction and ejection system as defined in claim 1, wherein said applied force at said lower member arises from the contacting pressure of said contained material.

6. A material compaction and ejection system as defined in claim 1, wherein said guide means comprises a vertical tracking slot located at the lateral edge of said ejection door, said tracking slot being operable to guide said upper member through said fixed path without impeding the rearward axial movement of said lower member.

7. A material compaction and ejection system as defined in claim 1, wherein said means for extending and retracting said door comprises a hydraulic lifting and retraction system connected to said door.

8. A material compaction and ejection system as defined in claim 1, further comprising mobilizing means for transporting said system between different locations.

9. A material compaction and ejection system as defined by claim 1, wherein said system is substantially fixed with respect to a single location said ejection system being operable to discharge its contents into a mobile receiving unit.

10. A compaction and ejection system as defined by claim 1, wherein said material comprises refuse.

* * * * *